(12) United States Patent
Schoenfellinger (10) Patent No.: US 10,807,312 B2
(45) Date of Patent: Oct. 20, 2020

(54) PACKAGING SEAL BAR AND METHOD OF FORMING A PACKAGE USING THE SAME

(71) Applicant: Dietz & Watson Inc., Philadelphia, PA (US)

(72) Inventor: John Michael Schoenfellinger, Holland, PA (US)

(73) Assignee: Dietz & Watson Inc., Philadelphia, PA (US)

( * ) Notice: Subject to any disclaimer, the term of this patent is extended or adjusted under 35 U.S.C. 154(b) by 294 days.

(21) Appl. No.: 15/493,393

(22) Filed: Apr. 21, 2017

(65) Prior Publication Data

US 2017/0305588 A1 Oct. 26, 2017

Related U.S. Application Data

(60) Provisional application No. 62/327,505, filed on Apr. 26, 2016.

(51) Int. Cl.

| | | |
|---|---|---|
| *B29C 65/08* | (2006.01) | |
| *B65D 81/20* | (2006.01) | |
| *B29C 65/00* | (2006.01) | |
| *B65D 77/20* | (2006.01) | |
| *B29C 65/02* | (2006.01) | |
| *B29C 65/76* | (2006.01) | |
| *B65B 25/06* | (2006.01) | |

(Continued)

(52) U.S. Cl.
CPC .............. *B29C 65/08* (2013.01); *B29C 65/02* (2013.01); *B29C 65/76* (2013.01); *B29C 66/112* (2013.01); *B29C 66/131* (2013.01); *B29C 66/232* (2013.01); *B29C 66/244* (2013.01); *B29C 66/24244* (2013.01); *B29C 66/30621* (2013.01); *B29C 66/53461* (2013.01); *B29C 66/849* (2013.01); *B29C 66/8432* (2013.01); *B65B 25/067* (2013.01); *B65D 77/2036* (2013.01); *B65D 81/2069* (2013.01); *B29C 51/10* (2013.01); *B29C 65/14* (2013.01); *B29C 66/8322* (2013.01); *B29L 2031/712* (2013.01); *B65B 9/04* (2013.01); *B65B 11/52* (2013.01); *B65B 31/028* (2013.01)

(58) Field of Classification Search
CPC ......... B29C 65/08; B29C 65/02; B29C 65/76; B29C 65/14; B29C 51/10; B29C 66/112; B29C 66/131; B29C 66/232; B29C 66/24244; B29C 66/244; B29C 66/30621; B29C 66/53461; B29C 66/8432; B29C 66/849; B29C 66/8322; B65B 25/067; B65B 9/04; B65B 11/52; B65B 31/028; B65D 77/2036; B65D 81/2069; B29L 2031/712
USPC ........... 53/433; 426/87, 106; 206/459.1, 807
See application file for complete search history.

(56) References Cited

U.S. PATENT DOCUMENTS

| | | | | |
|---|---|---|---|---|
| 2,181,252 A | * | 11/1939 | Vogel ..................... | B65D 27/16 229/80 |
| 4,198,972 A | * | 4/1980 | Herb ..................... | B65D 53/08 604/408 |

(Continued)

*Primary Examiner* — Dariush Seif
(74) *Attorney, Agent, or Firm* — Boyle Fredrickson, S.C.

(57) ABSTRACT

A sealing plate for use with a packaging machine that integrates a seal formed indicia into a portion of a package seal. A package having a seal formed indicia integrated into the package seal, which when the package is opened undergoes undergo a visual transformation, and a method of making the same.

19 Claims, 7 Drawing Sheets

(51) Int. Cl.
- *B29C 51/10* (2006.01)
- *B29L 31/00* (2006.01)
- *B29C 65/14* (2006.01)
- *B65B 11/52* (2006.01)
- *B65B 9/04* (2006.01)
- *B65B 31/02* (2006.01)

(56) References Cited

U.S. PATENT DOCUMENTS

| | | | | |
|---|---|---|---|---|
| 4,557,505 A * | 12/1985 | Schaefer | | B44F 1/00 |
| | | | | 206/807 |
| 4,709,396 A * | 11/1987 | Voshall | | B65D 27/30 |
| | | | | 206/459.1 |
| 4,876,123 A * | 10/1989 | Rivera | | B65D 55/026 |
| | | | | 428/34.2 |
| 4,972,953 A * | 11/1990 | Friedman | | B65D 77/003 |
| | | | | 206/459.1 |
| 5,064,664 A * | 11/1991 | Hustad | | B65D 75/5855 |
| | | | | 206/459.1 |
| 5,082,702 A * | 1/1992 | Alband | | B65D 55/026 |
| | | | | 428/36.92 |
| 5,103,979 A * | 4/1992 | Hustad | | B65D 33/34 |
| | | | | 206/459.1 |
| 5,492,411 A | 2/1996 | May | | |
| 5,882,116 A * | 3/1999 | Backus | | B65D 27/30 |
| | | | | 206/807 |
| 5,928,213 A * | 7/1999 | Barney | | A61J 1/10 |
| | | | | 206/219 |
| 6,244,746 B1 * | 6/2001 | Tokita | | B32B 7/06 |
| | | | | 383/1 |
| 6,743,451 B2 * | 6/2004 | Rasile | | B65D 33/2525 |
| | | | | 206/219 |
| 7,223,015 B2 * | 5/2007 | Steffens | | B65D 27/30 |
| | | | | 383/5 |
| 7,597,691 B2 * | 10/2009 | Kawaguchi | | A61J 1/10 |
| | | | | 383/210.1 |
| 7,681,732 B2 * | 3/2010 | Moehlenbrock | | B32B 7/12 |
| | | | | 206/459.1 |
| 7,717,897 B2 * | 5/2010 | Burg | | B29C 66/542 |
| | | | | 383/210.1 |
| 8,590,282 B2 * | 11/2013 | Perell | | B65B 5/02 |
| | | | | 53/492 |
| 9,650,180 B2 * | 5/2017 | Cigallio | | B65D 33/34 |
| 9,694,960 B2 * | 7/2017 | Conners | | B65D 75/44 |
| 2003/0056475 A1 * | 3/2003 | Nakabayashi | | B29C 65/02 |
| | | | | 53/485 |
| 2005/0247764 A1 * | 11/2005 | Sierra-Gomez | | B65D 75/5838 |
| | | | | 229/87.08 |
| 2008/0294129 A1 * | 11/2008 | Giori | | A61F 5/445 |
| | | | | 604/332 |
| 2011/0036817 A1 * | 2/2011 | Ehrmann | | B29C 65/1635 |
| | | | | 219/121.64 |

* cited by examiner

PACKAGING SEAL BAR AND METHOD OF FORMING A PACKAGE USING THE SAME

CROSS-REFERENCE TO RELATED APPLICATION

This application claims the benefit of U.S. Ser. No. 62/327,505 filed Apr. 26, 2016, the disclosure of which is incorporated herein in its entirety.

BACKGROUND OF THE INVENTION

1. Field of the Invention

This invention relates to a packaging machine, and more particularly to a seal bar or plate for use in a packaging machine. The invention also relates to a method of making a package using a seal bar or plate in a packaging machine.

2. Background

Many different attempts have been made to develop packaging for per food products, such as deli meats and cheeses or other items. One thermoformed packaging process, generally known as a form, fill, and seal process, includes the steps of forming a cavity in a web of material, placing products into the cavity, and then sealing the cavity using an overlying web of material. Alternatively, the cavity may be defined by a preformed tray or pouch, which is then sealed using an overlying web. In some applications, to prolong shelf life and postpone spoilage, air is removed from the interior of the thermoformed package via a process known as vacuum packaging. Other applications include modified atmosphere packaging (MAP) where an inert gas is injected into the thermoformed package or pouch either with or without prior vacuumization. In still other attempts to postpone spoilage, an oxygen scavenging packet may be placed into each package along with the product being packaged.

In many of these various prior packaging types, the top web and bottom web of material, or alternatively, single web of material folded over onto itself, which form the thermoformed package or pouch, are sealed together as to maintain the integrity of the package cavity. The seal that surrounds the cavity of the package forms a microbial barrier that prohibits contamination of the perishable food products contained therein. Such packages may also include a resealable closure, such as a zipper-type closure or other means such as resealable adhesive film, to close the cavity for product storage after the seal has initially been broken. However, it is often difficult to visually ascertain whether the initial package seal has been broken or whether the initial seal is still in place. This inability to determine the sealed status of the package may result in consumers questioning the freshness or preservation of the stored food products. Accordingly, there is a need for a package for use with perishable food products that provides an indication of whether the seal is opened or closed.

Also, in some packaging applications, it has been known for the identifying label or tag that has been adhesively affixed to or printed onto the outer surface of the flexible package material to become separated during use. Accordingly, there is a need for a package that can integrate identifying indicia directly into the package material, rather than one that would rely exclusively on the use of identifying labels or tags.

BRIEF DESCRIPTION OF THE INVENTION

By way of summary, in accordance with one aspect, the present invention contemplates a sealing plate for use with a packaging machine that integrates a seal formed indicia into a portion of the package seal. In this configuration, the indicia is integrated into the package without the need of external labels or tags.

In another aspect of the present invention, a package is provided having an indicia integrated into the package seal, which when the package is opened, i.e., the top and bottom webs of package material are separated, the sealing surfaces of the indicia undergo a visual transformation.

In one embodiment, the visual transformation of the sealing surfaces of the indicia may include a visibility increasing change, i.e., a color change, such that the indicia is more visible when the package has been opened.

In another embodiment of the present invention, the visually transformative indicia of the package seal may be a tamper-evident indicator. The tamper indicator may provide a consumer of the perishable food product or other items with an indication of whether the package seal has been previously opened.

These and other features and aspects of the present invention will be better appreciated and understood when considered in conjunction with the following description and the accompanying drawings. It should be understood, however, that the following description, while indicating representative embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

In describing the embodiments of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word "connected," "attached," or terms similar thereto are often used. They are not limited to direct connection, but include connection through other elements where such connection is recognized as being equivalent by those skilled in the art.

DETAILED DESCRIPTION

The various features and advantageous details of the subject matter disclosed herein are explained more fully with reference to the non-limiting embodiment described in detail in the following description.

1. Sealing Plate

Figure 1:
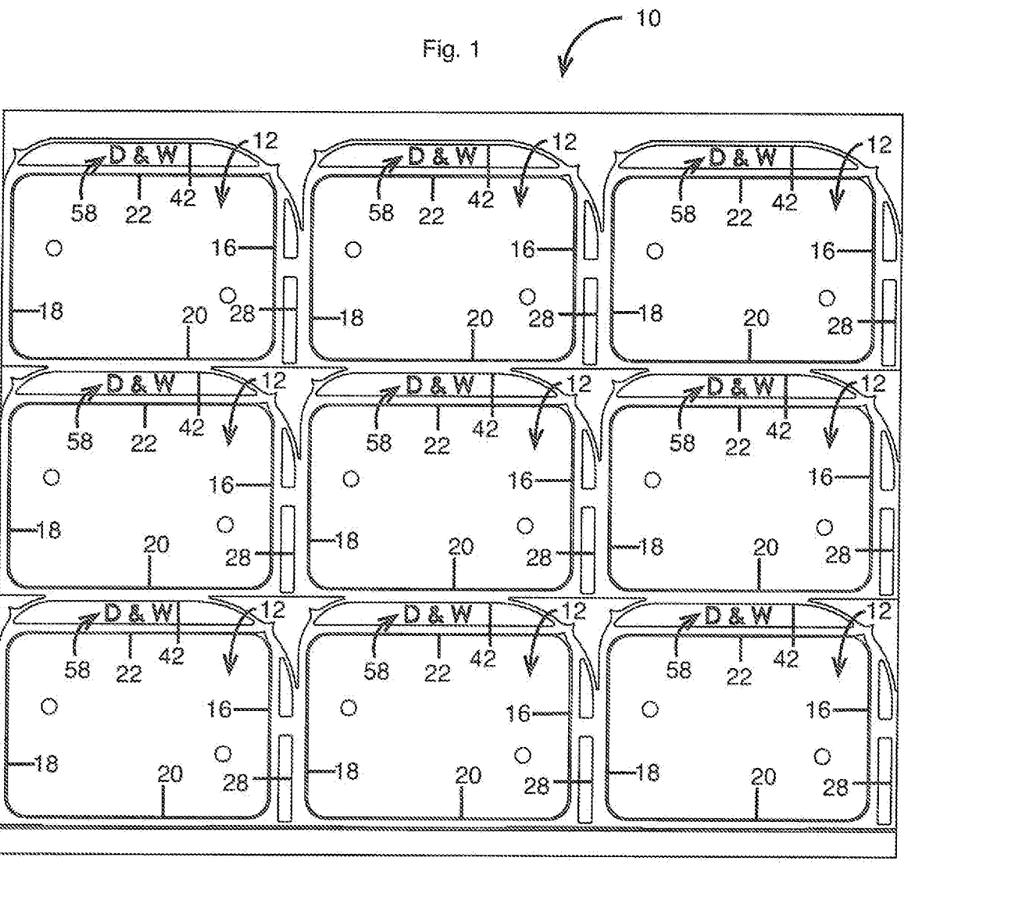
FIG. 1 is a top plan view of a multi-package sealing plate configured for use with a thermoformed sealing mechanism in accordance with one embodiment of the present invention.
Figure 2:
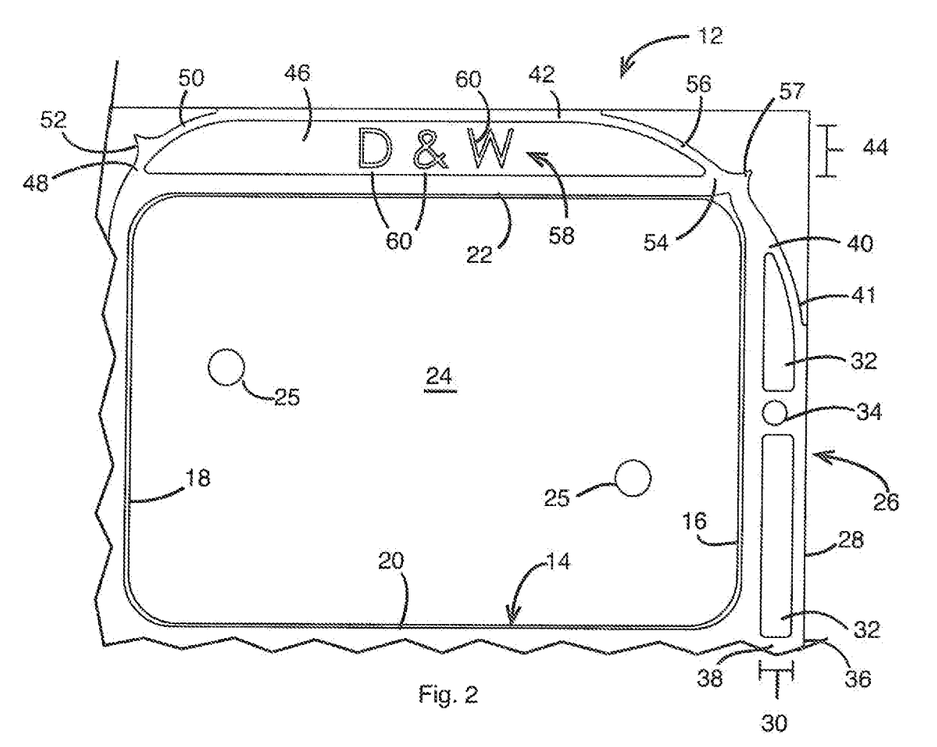
FIG. 2 is a detailed top plan view of a single package portion of the multi-package sealing plate of FIG. 1.
Figure 3:
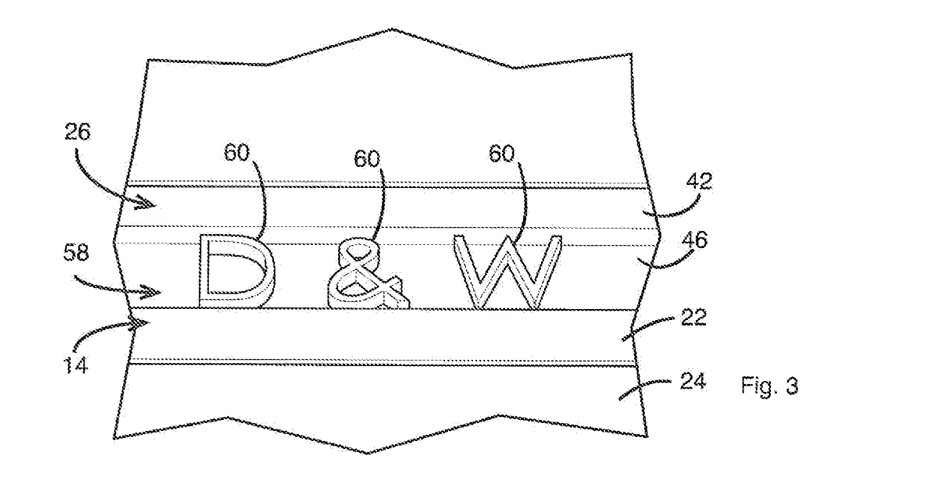
FIG. 3 is a front top perspective detailed view of a portion of a sealing bar associated with the single package portion of the multi-package sealing plate of FIG. 1.

Referring to FIGS. 1-3, and initially FIG. 1, one embodiment of the present invention provides a sealing plate 10 for use in manufacturing thermoformed packages, such as vacuum packages and modified atmospheric packages. As shown in FIG. 1, the sealing plate 10 includes a series of individual package sealing forms 12 integrated into the sealing plate 10. While the plate 10 shown in FIG. 1 will allow for multiple packages to be simultaneously formed, it should be understood that the present invention is in no way so limited and that any number of package sealing forms 12 may be integrated into the plate 10.

A detailed view of an individual package sealing form 12, which corresponds to the manufacture of an individual thermoformed package, is shown in FIG. 2. Each package sealing form 12 includes an elevated inner rim 14, including a first side edge 16, an opposed second side edge 18, a bottom edge 20 extending between the first and second side edges 16, 18, and a top edge 22 opposite the bottom edge 20. The inner recessed surface 24 of the form 12, which defines the package cavity as described below, is fully surrounded by the interconnected four sides 16, 18, 22, 20 of the elevated inner rim 14. One or more apertures 25 may be located within the recessed surface 24 so as to allow atmospheric changes to be applied to the sealing form 12 when in use. For example, such apertures 25 may introduce a vacuum or alternatively modified atmosphere into the area of the recessed surface 24 during the formation of the packages as will be described in further detail below.

In addition to the inner rim 14, each individual package sealing form 12 of the present invention may also include an elevated outer rim 26. As shown in FIG. 2, in one embodiment of the present invention, the elevated outer rim 26 includes a first side edge 28, which is located generally parallel to the first side edge 16 of the elevated inner rim 14 and is spaced therefrom by a distance 30. The distance 30 of the form 12 may be generally defined by a side recessed surface 32 that is bordered on opposing sides by the inner side edge 16 and the outer side edge 28, both of which are elevated relative to the side recessed surface 32. In one embodiment, as shown in FIG. 2, the side recessed surface 32 may be bifurcated by an elevated extension 34, which spans the side recessed surface 32 and connects the inner side edge 16 to the outer side edge 28. As will be described in further detail below, the elevated extension 34 will correspond to a rigid portion of the resultant package which may support therein an aperture to allow the package to be hung from a peg display or the like. Additionally, as shown in FIG. 2, a first end 36 of the side edge 28 of the elevated outer rim 26, which defines a corner of the form 12, may be integrally connected to the first side edge 16 of the inner elevated rim 14 by way of a length 38. The opposing second end 40 of the side edge 28 may also be integrally connected to the first side edge 16 of the elevated inner rim 14. While the form 12 shown in FIG. 2 illustrates the second end 40 of the side edge 28 directly connected to the side edge 16 by a curved portion 41, it should be understood that alternative integral connection orientations are considered within the scope of this invention. Resultantly, as will be described in further detail below, the side recessed surface 32 of the form 12, will define an unsealed side portion in the package that is fully surrounded by the interconnected first side edge 16 of the elevated inner rim 14, the side edge 28 and the length 38 of the elevated outer rim 26.

Additionally, the elevated outer rim 26 of each individual package sealing form 12 may also include a top edge 42, which is oriented generally parallel to the top edge 22 of the elevated inner rim 14 and is removed therefrom by a distance 44. The distance 44 of the form 12 may be generally defined by a top recessed surface 46 that is bordered on opposing sides by the top edge 22 of the elevated inner rim 14 and the top edge 42 of the elevated outer rim 26. Additionally, as shown in FIG. 2, a first end 48 of the top edge 42, which defines a corner of the form 12, may be integrally connected to the top edge 22 of the inner elevated rim 14 by way of a curved portion 50. A tapered projection 52, integral with the top edge of the elevated outer rim 26, may extend outwardly from the curved portion 50. In use, as will be described below, this projection 52 will result in the formation of a corresponding outward projection in the thermoformed seal, which may be used as a starting location to facilitate opening the thermoformed seal. Still referring to FIG. 2, the opposing second end 54 of the top edge 42, which is also generally located near a corner of the form 12, may be integrally connected to the top edge 22 of the elevated inner rim 14 by way of a curved portion 56. As shown in FIG. 2 the curved portion 56 of the top edge 42 may be contiguous with the curved portion 41 of the adjacent side edge 28. Furthermore, a tapered projection 58, integral with the outer elevated rim 26 may extend outwardly from the curved portions 56, 41. As previously described, this tapered projection 57 will also result in the formation of a corresponding outward projection in the thermoformed seal, which may be used as a starting location to facilitate opening the thermoformed seal. As a result of the general orientation of the top edge 22 of the elevated inner rim 14 and top edge 42 of the elevated outer rim 26, as will be described in further detail below, the top recessed surface 46 of the form 12 will define an unsealed top portion in the package that is fully surrounded by the interconnected top edges 16, 42.

Furthermore, turning now to FIG. 3, the individual package sealing form 12 of the present invention may also include an indicia embossment 58. The indicia embossment 58 is disposed within the top recessed surface 46 between the top edge 24 of the elevated inner rim 14 and the top edge 42 of the elevated outer rim 26. In one representative embodiment of the present invention, the indicia embossment 58 may include one or more alphanumeric characters 60. In another representative embodiment of the present invention, the indicia embossment 58 may include one or more graphical elements (not shown), or a combination of graphical elements and alphanumeric characters 60. As is shown in FIG. 3, in a non-limiting exemplary embodiment, the indicia embodiment 58 is formed of the alphanumeric characters: "D & W".

As previously described, the surface area of the sealing form 12 surrounding indicia embossment 5 and defined between the top edge 22 of the elevated inner rim 14 and the top edge 42 of the elevated outer rim 26 is a top recessed surface 46, where the height of the elevated inner rim 16, the elevated outer rim 26 and the indicia embossment 32 is greater, i.e., higher, than that of the recessed surfaces, 24, 32, 46. As a result of the elevated inner rim 16, the elevated outer rim 26 and the indicia embossment 32 having a greater height than the adjacent top recessed surface 46, no seal will be formed in the package at the location of the top recessed surface 46, as will be described in further detail below. Resultantly, the seal formed in a shape corresponding to the upper surface of the indicia embossment 58 will be visibly formed in the package due to the package's lack of seal formed in the surrounding area, as will be described in further detail below.

Returning now to FIG. 1, as was previously stated, the sealing plate 10 includes a number of individual package sealing forms 12. As shown in FIG. 1, the top edge 42 of the elevated outer rim 26 of one sealing form 12 may contact or be contiguously formed with the bottom edge 22 of the elevated inner rim 14 of an adjacently located individual package sealing form 12. Similarly, the first side edge 28 of the elevated outer rim 26 of one sealing form 12 may contact or be contiguously formed with the second side edge 18 of the elevated inner rim 14 of an adjacently located individual package sealing form 12. In such a configuration, adjacent packages formed from the use of such a plate 10 will initially be formed in an interconnected manner and then be subsequently separated after the sealing of the packages, as will be described in further detail below.

2. Thermoformed Package

Figure 4:
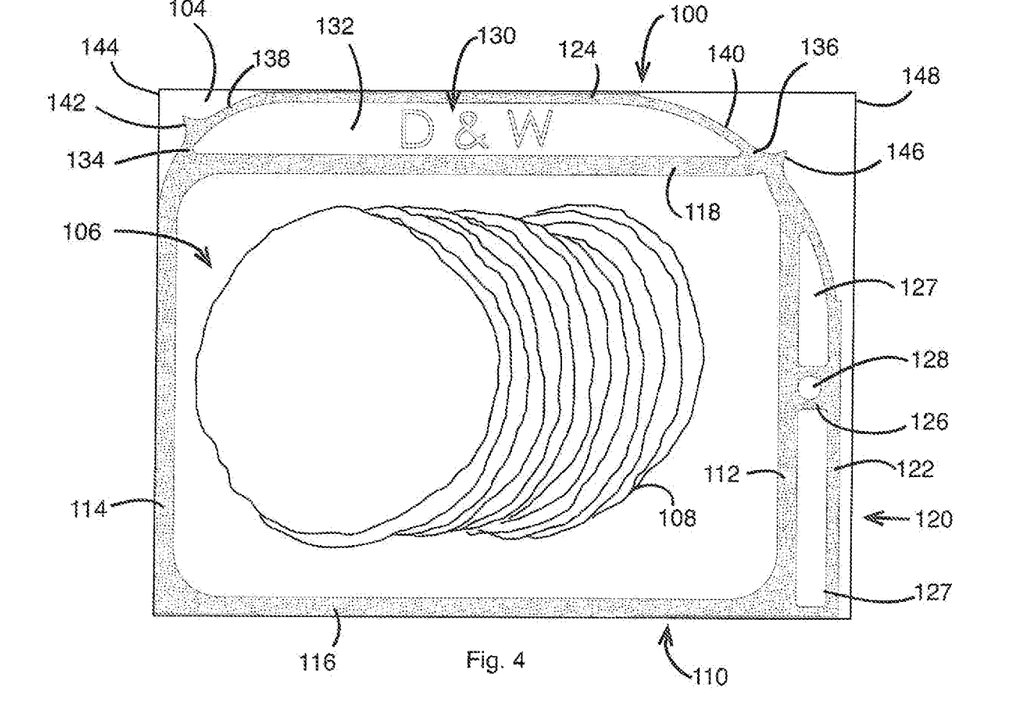
FIG. 4 is a top plan view of a single sealed package, in a full scaled configuration, manufactured in a sealing machine using the sealing plate in accordance with one embodiment of the present invention.

Turning now to FIGS. 4-12, a representative package 100 formed in-part by use of the above-described sealing plate 10 is illustrated in accordance with one embodiment of the present invention. As shown generally in FIGS. 4-12, the package 100 is formed of a first, or bottom, web 102 of material, which is joined to a second, or top, web 104 of material. In one embodiment of the present invention, the material that forms the top and bottom webs 102, 104 may be a clear single or multilayer film, formed of plastic or any other satisfactory material that can be molded and/or melted with exposure to heat. Referring now to FIG. 4, the package 100 defines a sealed cavity 106 for retaining a perishable food product 108, such as sliced deli meat or cheese, therein. The sealed cavity 106 is bordered by an inner seal 110 that joins the top and bottom webs 102, 104 together. The inner seal 110 includes a first side edge 112, an opposed second side edge 114, a bottom edge 116 extending between the first and second side edges 112, 114, and a top edge 118 opposite the bottom edge 116. The inner seal 110 may be formed by direct or indirect contact of the top and bottom webs 102, 104 with the upper surface of the elevated inner rim 14 of the seal plate 10, as previously described. As such, the shape and configuration of the inner seal 110 is consistent with that of the elevated inner rim 14. Similarly, and still referring to FIG. 4, the package 100 may also include an outer seal 120, including a first side edge 122 and a top edge 124, which correspond to the shape and configuration of the upper surface of the first side edge 28 and a top edge 42 of the elevated outer rim 26 of the one or more seal form 12 located on the seal plate 10.

Furthermore, as shown in FIG. 4, the package 100 may also include a seal extension area 126 extending from the first side edge 112 of the inner seal 100 to the first side edge 122 of the outer seal 120. As shown in FIG. 4, the seal extension area 126, which corresponds to the shape and configuration of the elevated extension 34 of the one or more seal form 12 located on the seal plate 10, may be generally centrally located about the longitudinal axis of the package 100. As such, the seal extension area 126 provides a rigid or semi-rigid sealed surface for which an aperture 128 may extend therein, through the top and bottom webs 102, 14. In this configuration, the package 100 may be evenly hung on a peg-style display or the like. Similarly, the area of the package 100, between the first side edge 112 of the inner seal 110 and the first side edge 122 of the outer seal 120, which does not constitute the seal extension area 126 is an unsealed area 127 that corresponds to the location of the side recessed area 32 in the one or more seal forms 12 located on the seal plate 10.

Additionally, a seal formed indicia 130 is also shown in FIG. 4, located between the top edge 188 of the inner seal 110 and the top edge 124 of the outer seal 120. The seal formed indicia 130 corresponds to the size and shape of the upper surface of the indicia embossment 58 of the one or more seal forms 12 located on the seal plate 10, as previously described. Similarly, the area of the package 100, between the top edge 118 of the inner seal 110 and the top edge 124 of the outer seal 120, which does not constitute the seal formed indicia 130 is an unsealed area 132 that corresponds to the location of the top recessed area 46 in the one or more seal forms 12 located on the seal plate 10. The seal formed indicia 130 are positioned on the package 100 so as to be located outwardly of the inner seal 110, which in accordance with one embodiment of the present invention, may be formed with a resealable closure, such as a zipper-type closure, in a manner as is known.

Additionally, as illustrated in FIG. 4, the portions of the top edge 124 of the outer seal 120, at the opposing first end 134 and second end 136 thereof may be formed of curvilinear portions 138, 140, respectively. The first and second ends 134, 136 may intersect the top edge 118 of the inner seal 110, corresponding to the previously described orientation of the inner and outer elevated rims 14, 26 of the one or more seal forms 12 located on the seal plate 10. Similarly, a tapered seal projection 142 may extend outwardly from the curvilinear portion 138 of the top edge 124 located generally at a corner 144 of the thermoformed package 100, while a tapered seal projection 146 may extend outwardly from the curvilinear portion 140 of the top edge 124 located generally at an opposing corner 148 of the package 100. The tapered seal projections 142, 144 generally correspond to the tapered projections 52, 57 of the one or more seal forms 12 located on the seal plate 10, respectively, and are configured to function as a starting point to facilitate separating the first web 102 from the second web 104 at the inner seal 110 and outer seal 120.

Figure 5:
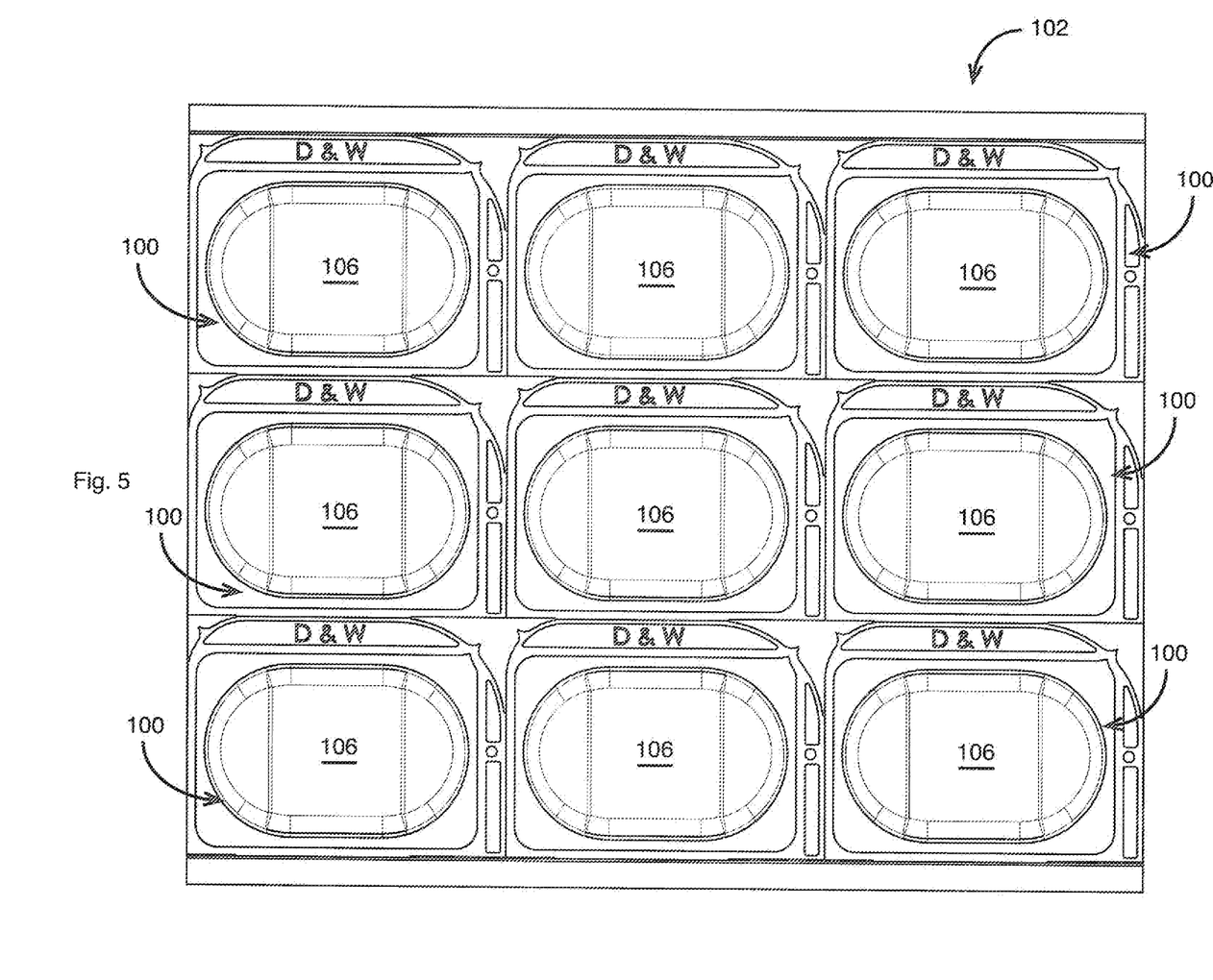
FIG. 5 is a top plan view of a bottom web of material forming half of a series of sealed packages manufactured in a sealing machine using the multi-package sealing plate of FIG. 1.
Figure 6:
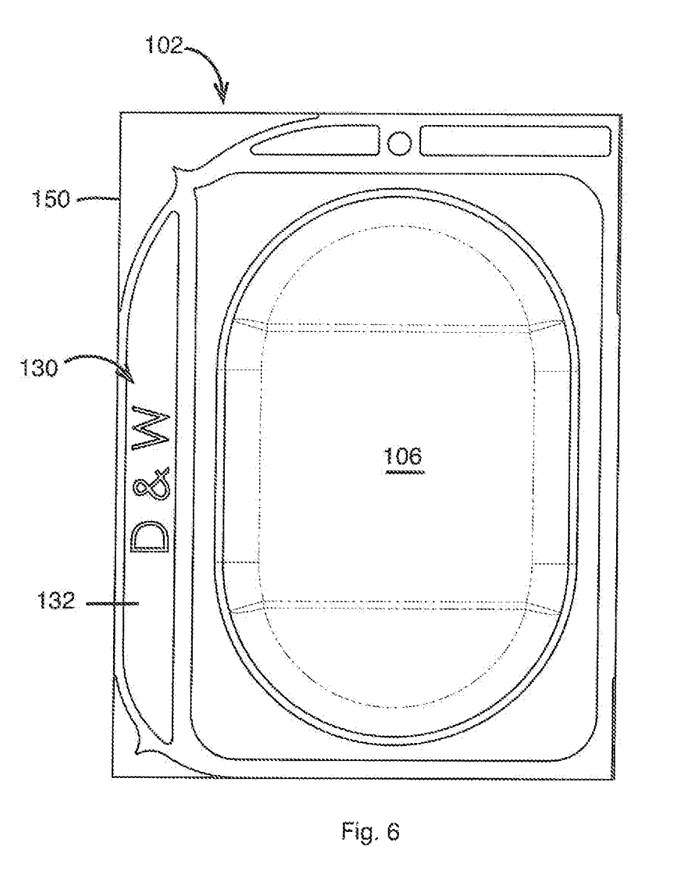
FIG. 6 is a detailed top plan view of a portion of the bottom web of material corresponding to a single package from the web of material of FIG. 5.
Figure 7:
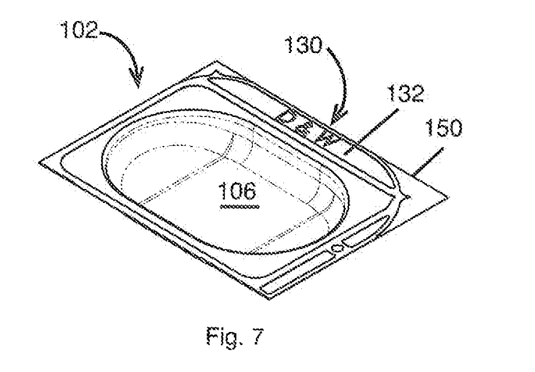
FIG. 7 is a top perspective view of the portion of the bottom web of material shown in FIG. 6.
Figure 8:
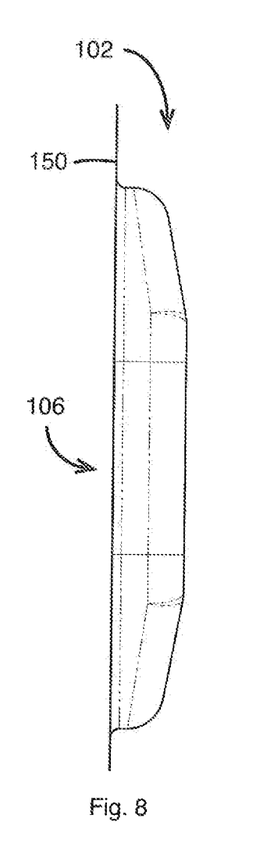
FIG. 8 is a front elevation view of the portion of the bottom web of material shown in FIG. 6.

Turning now to FIGS. 5-12, the package 100, as described above, is shown in two orientations during the manufacturing process thereof. FIGS. 5-8 initially illustrate a bottom portion 150 of the package 100 manufactured in accordance with one embodiment of the present invention. Specifically, as shown in FIG. 5, the first or bottom web 102 of material may be subject to a thermoform molding process, in which the first web 102 is heated while resting on a mold and then subject to a negative pressure, which forces the first web 102 to form the series of interconnected bottom portions 150. Each bottom portion 150 includes a recessed cavity 106 defined within the inner rim 14 of the sealing form 12 and is generally defined by the contours of the underlying sealing form 12. The recessed cavity 106 is formed by way of the vacuum or negative pressure supplied via the apertures 25 in the recessed surface 24 of the sealing form 12. FIGS. 6-8 proved additional exemplary views of a representative bottom portion 150 of a thermoformed package 100, in accordance with one embodiment of the present invention, as was described above. Alternatively, the cavity 106 may be defined by a rigid or semi-rigid tray in a manner as is known, or by a pouch arrangement in which a single web is folded over onto itself with the food product 108 therebetween, also in a manner as is known.

Figure 9:
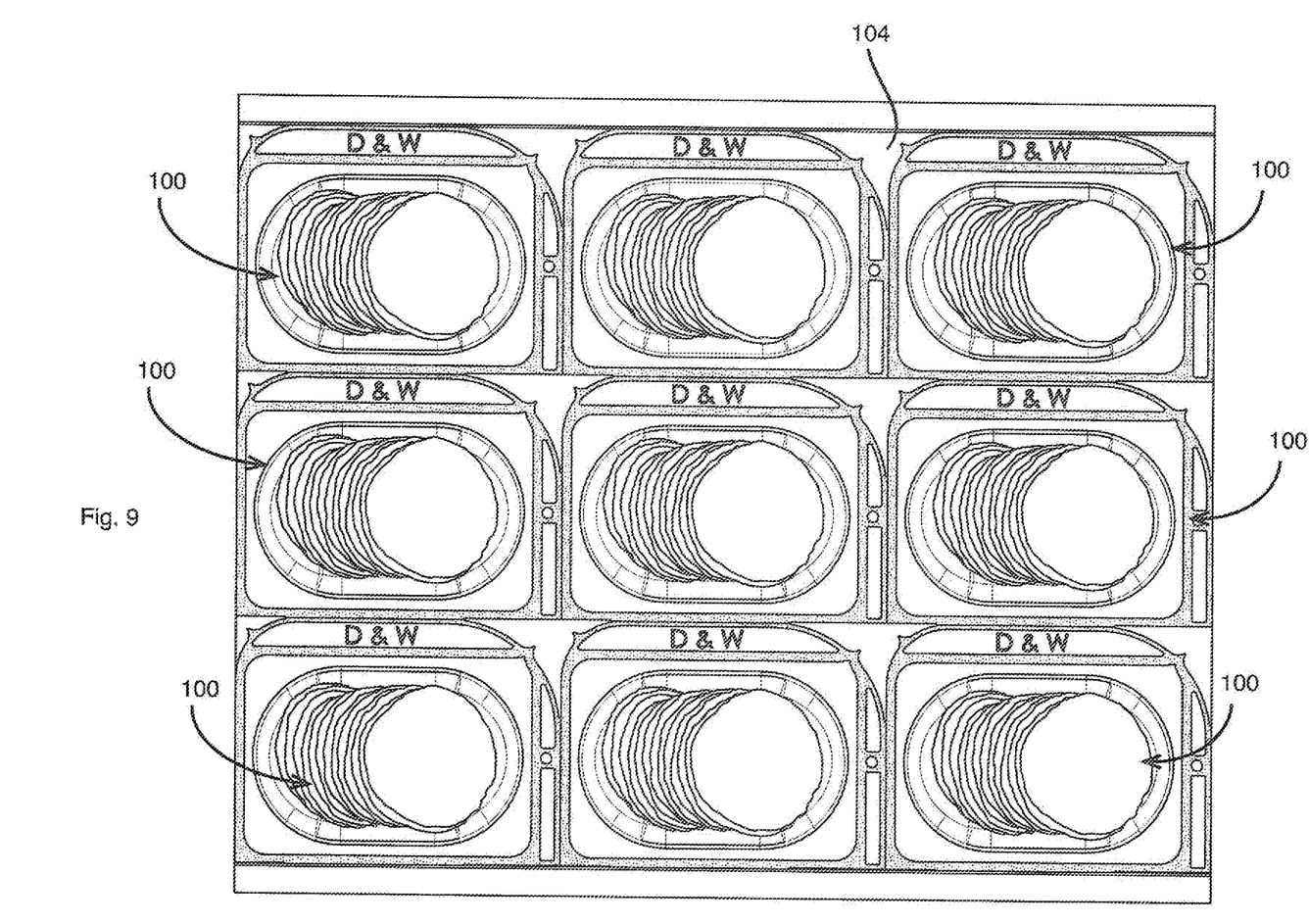
FIG. 9 is a top plan view of a top web of material affixed to the bottom web of material shown in FIG. 5, forming a series of thermoformed sealed packages, including a food product contained therein, that are manufactured in a thermoformed sealing machine using the multi-package sealing plate of FIG. 1.
Figures 10, 12:
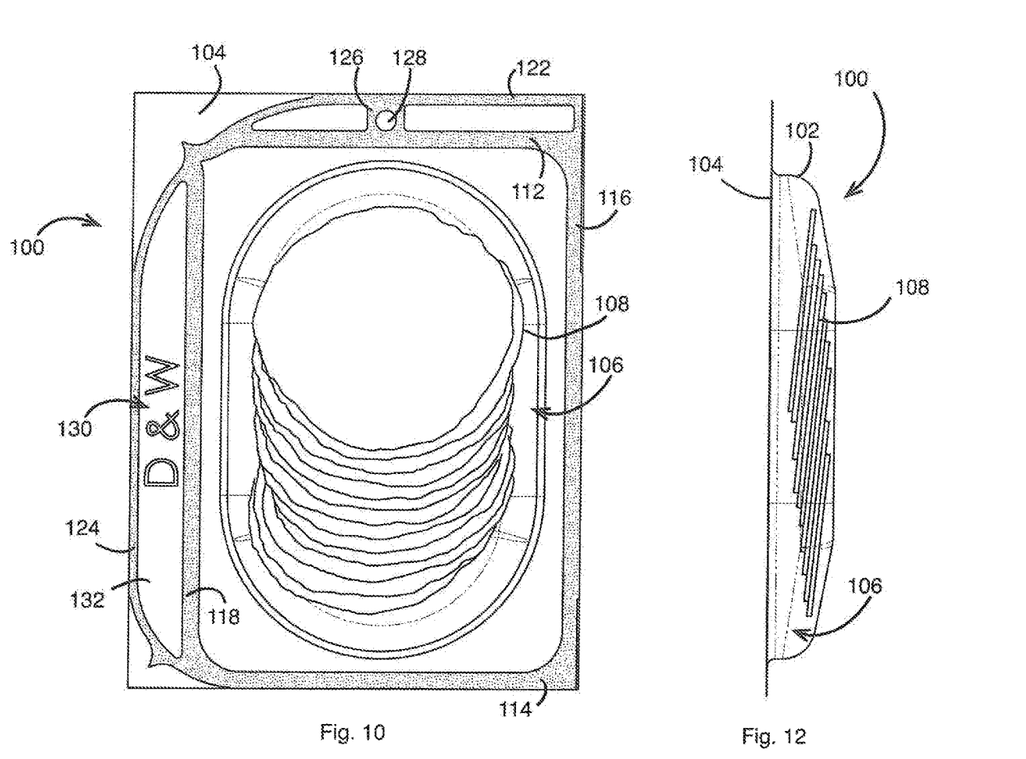
FIG. 10 is a detailed top plan view of the top web of material affixed to the bottom web of material corresponding to a single sealed package, from the webs of material of FIG. 9.
FIG. 12 is a front side elevation view of the portion of the sealed package shown in FIG. 10.
Figure 11:
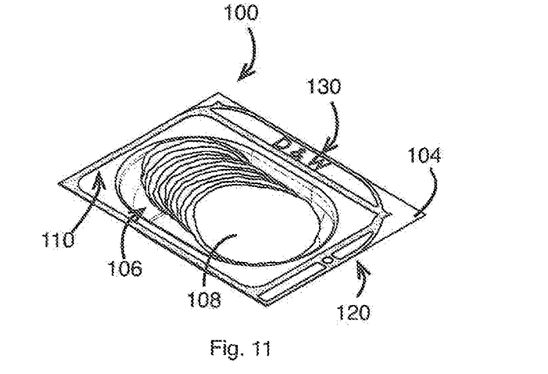
FIG. 11 is a top perspective view of the portion of the sealed package shown in FIG. 10.

Turning now to FIGS. 9-12, and initially FIG. 9, the perishable food product 108, or other items, is shown having been placed into each recessed cavity 106 of the multiple interconnected bottom portions 150. A second or top web 104 of material is shown overlying the recessed cavity 106 of each interconnected bottom portion 150. The atmosphere of the recessed cavity 106 may then be selectively modified through the introduction of vacuum, i.e., negative pressure, or the introduction of a modified atmospheric agent, such as, but not limited to, a nonreactive gas. Subsequently, the inner seal 110, outer seal 120 and seal formed indicia 130 are formed in the package 100 by way of transmitting ultrasonic acoustic vibrations or heat through the seal plate 10, which is in direct or indirect contact with the first and second webs 102, 104. In one embodiment, the sealing of the packages 100 may include forming the various seals 110, 120, 130 by way of pressing the packages 100 between two opposed compatible sealing plates 10. After sealing, the interconnected individual packages 100 are then cut from their webs 102, 104 and the aperture 128 is punched into the seal extension area 126, resulting in individual sealed packages as previously shown in FIG. 4. FIGS. 10-12 proved additional exemplary views of a package 100 as described above, in accordance with one embodiment of the present invention.

Figure 13:
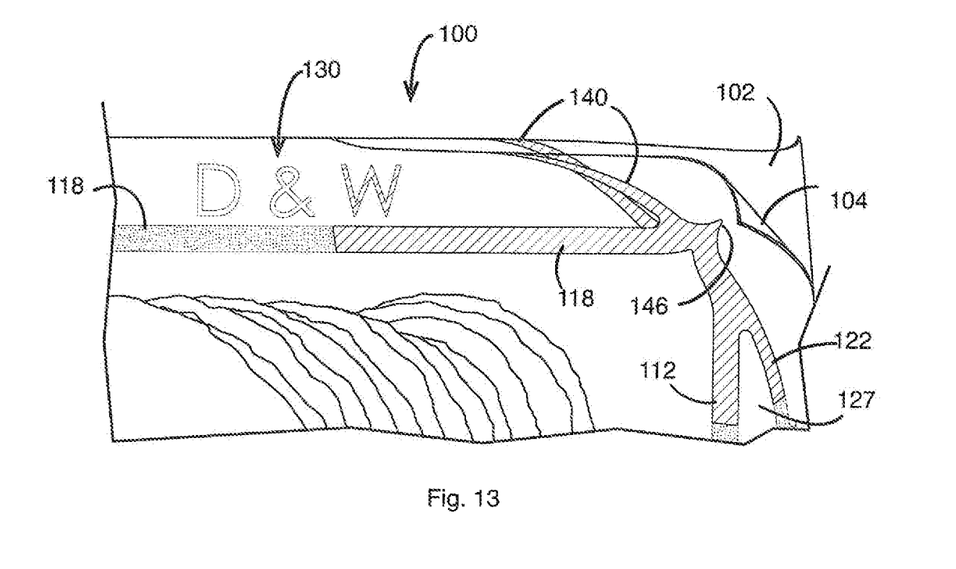
FIG. 13 is a detailed top plan view of the single sealed package shown in FIG. 4, with the seal between the top web of material and bottom web of material partially separated.
Figure 14:
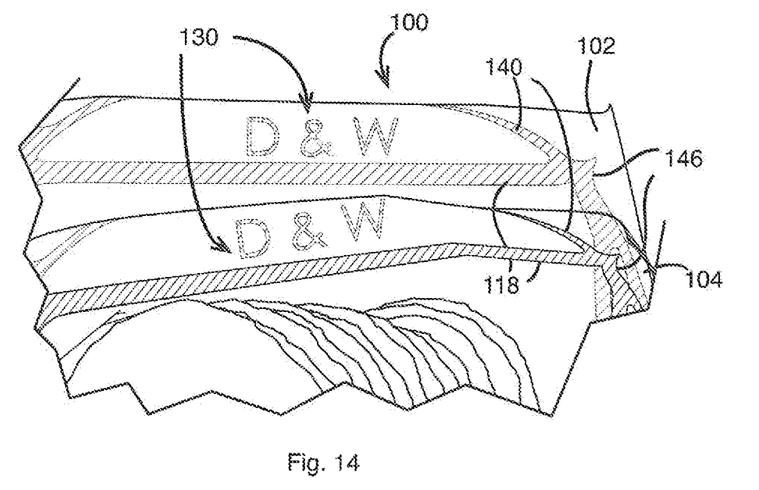
FIG. 14 is a detailed top plan view of the single package shown in FIG. 4, with the seal between the top web of material and bottom web of material fully separated.

Turning now to FIGS. 13 and 14, the package 100 is shown in various stages of unsealing or opening. As illustrated in FIGS. 4 and 9-12, the inner seal 110, outer seal 120 and the seal formed indicia 130 are identified by stippling, when the first and second webs 102, 104 are connected together. That is to say, when the seals 110, 120, 130 are formed and the package 100 is in a closed configuration, the seals 110, 120, 130 are represented by stippling. In use, the seals 110, 120, 130 are generally preferably transparent when the package 100 is in this closed or sealed configuration. Turning now to FIG. 13, as illustrated, the package 100 is partially opened, resulting in the separation of the first web 102 from the second web 104 in-part at the inner seal 110, the outer seal 120 and the seal formed indicia 130. The separated, or opened portions of these seals 110, 120, 130 are represented by hatching or diagonal parallel lines, as to distinguish them from the closed portions of the seals 110, 120, 130 that remain represented by stippling. In use, the seals 110, 120, 130 of the package 100 each may undergo a visual transformation as the first web 102 is separated from the second web 104 at the location of the seals 110, 120, 130. That is to say, that the surface area of the first and second webs 102, 104, which form the various seals, 110, 120, 130, may change color as the respective seals are separated or broken and the thermoformed package 100 is opened. In one illustrated embodiment of the present invention, the surface area of the first and second webs 102, 104, which form the various seals, 110, 120, 130, changes from transparent to an opaque or a translucent white color as the respective seals 110, 120, 130 are broken and the package 100 is opened. Of course, other visual transformations are considered within the scope of this invention. FIG. 14 provides an additional exemplary view of the package 100 in a fully opened orientation, in which all portions of the various seals, 110, 120, 130 have been opened. That is to say that the first web 102 has been generally entirely separated from the second web 104 at the inner seal 110, the outer seal 120 and the seal formed indicia 130, resulting in the surface areas of the seals 110, 120, 130 having undergone a visual change from transparent to an opaque or a translucent white color, as was described above.

As a result of this visual transformation of the seals, the surface area of the first and second webs 102, 104, which form the various seals, 110, 120, 130, and particularly the seal formed indicia 130, becomes increasingly visible as the package 100 is opened. As such, the graphical elements and/or alphanumeric characters 60 that formed the seal formed indicia 130, which were imprinted via the embossment 58 of the seal plate 10, become increasingly visible as the package 36 is opened. As is shown in FIGS. 4, 13, and 14, in a non-limiting exemplary embodiment, the seal formed indicia 130 is formed of the alphanumeric characters: "D & W," which corresponds to the indicia embodiment 58 shown In FIGS. 1-3. However, alternative alphanumeric characters 60 and/or graphical elements are considered within the scope of the present invention. By way of example, the indicia embodiment 58 and resultant seal formed indicia 130 may display the word "OPEN," which becomes visible through the visual transformation of the seals once the first and second webs 102, 104 have been separated. As such, the seal formed indicia 130 may function as a temper-evident indicator in the thermoformed package 100.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A sealed package, comprising:
one or more packaging components defining a storage cavity for receiving one or more items to be packaged;
a seal arrangement for sealing the storage cavity, wherein the seal arrangement includes facing first and second seal surfaces defined by the one or more packaging components that are bonded together at a first seal line and a second seal line that is spaced apart from the first seal line to inhibit access to the storage cavity, wherein the first and second seal lines can be separated to form an opening that provides access to the storage cavity; and
a seal formed indicia defined by the one or more packaging components disposed in an unsealed area disposed between the first seal line and the second seal line of the seal arrangement, wherein the seal formed indicia has a first visual appearance and is discernible within the unsealed area when the seal arrangement is intact, and is configured to undergo visual transformation to provide a second visual appearance different from the first visual appearance when the seal arrangement is broken to form the opening, wherein the seal formed indicia is discernible within the unsealed area both when the seal formed indicia has the first visual appearance and the second visual appearance, and wherein the second visual appearance of the seal formed indicia provides a visual indication that the seal arrangement has been broken.

2. The sealed package of claim 1, wherein the sealed package is a thermoformed package.

3. The sealed package of claim 2, wherein an atmosphere of the storage cavity comprises a pressure less than standard atmospheric pressure when the seal arrangement is in a bonded configuration.

4. The sealed package of claim 2, wherein an atmosphere of the storage cavity comprises an oxygen content less than that of the oxygen content of standard atmosphere.

5. The sealed package of claim 2, wherein an atmosphere of the storage cavity comprises a nitrogen content higher than that of the nitrogen content of standard atmosphere.

6. The seal arrangement of claim 1, wherein the first seal line defines an inner seal line adjacent the storage cavity and the second seal line defines an outer seal line positioned outwardly from the inner seal line.

7. The seal arrangement of claim 6, wherein the seal formed indicia is spaced apart from the inner seal line and the outer seal line.

8. The sealed package of claim 6, wherein the inner seal line defines an outer perimeter of the storage cavity.

9. The sealed package of claim 8, wherein the inner seal line comprises:
a top edge having a first end and a second end;
a first side edge having a first end and a second, wherein the first end of the first side edge generally perpendicularly intersects the second end of the top edge defining a first corner of the inner seal line;
a bottom edge having a first end and a second end, wherein the first end of the bottom edge generally perpendicularly intersects the second end of the first side edge defining a second corner of the inner seal line; and,
a second side edge having a first end and a second end, wherein the first end of the second side edge generally perpendicularly intersects the second end of the bottom edge defining a third corner of the inner seal line, and the second end of the second side edge generally perpendicularly intersects the first end of the top edge defining a fourth corner of the inner seal line.

10. The sealed package of claim 9, wherein the outer seal line extends about the top edge and first side edge of the inner seal line.

11. The sealed package of claim 10, wherein the outer seal line comprises:
a top edge of the outer seal line having a first end and a second end, wherein the first end of the top edge of the outer seal line extends to the first corner of the inner seal line and the second end of the top edge of the outer seal line extends to the fourth corner of the inner seal line; and,
a first side edge of the outer seal line having a first end and a second end, wherein the first end of the first side edge of the outer seal line extends to the second corner of the inner seal line and the second end of the first side edge of the outer seal line extends to the first corner of the inner seal line.

12. The sealed package of claim 11, wherein the seal arrangement further comprises a tapered seal projection extending outwardly from the top outer seal line.

13. The sealed package of claim 11, further comprising a seal extension area extending generally from a midline of the first side edge of the outer seal line to a midline of the first side edge of the inner seal line, wherein an aperture is disposed within the seal extension area.

14. The sealed package of claim 1, wherein the first visual appearance of the seal formed indicia is generally translucent.

15. The sealed package of claim 14, wherein the second visual appearance of the seal formed indicia is opaque.

16. The sealed package of claim 1, wherein the seal formed indicia comprises one or more alphanumeric characters.

17. The sealed package of claim 16, wherein the seal formed indicia is a tamper-evident indicator.

18. A sealed thermoformed package, comprising:
one or more packaging components defining a storage cavity for receiving one or more items to be packaged with an oxygen content less than that the oxygen content of standard atmosphere;
a seal arrangement for sealing the storage cavity, wherein the seal arrangement includes facing first and second seal surfaces defined by the one or more packaging components that are bonded together at an inner seal line and an outer seal line that is spaced apart from the inner seal line to inhibit access to the storage cavity and that can be separated to form an opening that provides access to the storage cavity;
wherein the inner seal line of the seal arrangement comprises a top edge, bottom edge, first side edge and second side edge in a generally rectangular configuration defining a first corner, a second corner, a third corner and a fourth corner;
wherein the outer seal line of the seal arrangement comprises a top edge and a first side edge; and
a seal formed indicia defined by the one or more packaging components disposed in an unsealed area disposed between the top edge of the inner seal line and the top edge of the outer seal line of the seal arrangement, wherein the seal formed indicia has a first visual appearance and is discernible within the unsealed area when the seal arrangement is intact, and is configured to undergo visual transformation to provide a second visual appearance different from the first visual appearance when the seal arrangement is broken to form the opening, wherein the seal formed indicia is discernible within the unsealed area both when the seal formed indicia has the first visual appearance and the second visual appearance, and wherein the second visual appearance of the seal formed indicia provides a visual indication that the seal arrangement has been broken.

19. A sealed thermoformed package, comprising:
one or more packaging components defining a storage cavity for receiving one or more items to be packaged;
a seal arrangement for sealing the storage cavity, wherein the seal arrangement includes facing first and second seal surfaces defined by the one or more packaging components that are bonded together at an inner seal line and an outer seal line that is spaced apart from the inner seal line to inhibit access to the storage cavity and that can be separated to form an opening that provides access to the storage cavity;
wherein the inner seal line of the seal arrangement comprises a top edge, bottom edge, first side edge and second side edge in a generally rectangular configuration defining a first corner, a second corner, a third corner and a fourth corner;
wherein the outer seal line of the seal arrangement comprises a top edge, a first side edge, and at least one tapered seal projection extending outwardly from the outer seal line;
a seal formed indicia defined by the one or more packaging components disposed in an unsealed area disposed between the top edge of the inner seal line and the top edge of the outer seal line of the seal arrangement, wherein the seal formed indicia has a first visual appearance and is discernible within the unsealed area when the seal arrangement is intact, and is configured to undergo visual transformation to provide a second visual appearance different from the first visual appearance when the seal arrangement is broken to form the opening, wherein the seal formed indicia is discernible within the unsealed area both when the seal formed indicia has the first visual appearance and the second visual appearance, and wherein the second visual appearance of the seal formed indicia provides a visual indication that the seal arrangement has been broken; and,
a seal extension area extending generally from a midline of the first side edge of the outer seal line to a midline of the first side edge of the inner seal line, wherein an aperture is disposed within the seal extension area.

* * * * *